(12) United States Patent
Kimura

(10) Patent No.: US 7,664,899 B2
(45) Date of Patent: Feb. 16, 2010

(54) COMMUNICATION SYSTEM, COMMUNICATION APPARATUS, CONTROL METHOD THEREFOR, AND COMPUTER PROGRAM

(75) Inventor: Atsushi Kimura, Tokyo (JP)

(73) Assignee: Sony Corporation, Tokyo (JP)

( * ) Notice: Subject to any disclaimer, the term of this patent is extended or adjusted under 35 U.S.C. 154(b) by 92 days.

(21) Appl. No.: 12/110,786

(22) Filed: Apr. 28, 2008

(65) Prior Publication Data

US 2009/0006686 A1 Jan. 1, 2009

(30) Foreign Application Priority Data

Jun. 26, 2007 (JP) ............................. 2007-167617

(51) Int. Cl.
*G06F 13/42* (2006.01)
(52) U.S. Cl. .................. 710/106; 710/110; 710/317
(58) Field of Classification Search ......... 710/104–110, 710/306–317
See application file for complete search history.

(56) References Cited

FOREIGN PATENT DOCUMENTS

| JP | 2004-316072 | 11/2004 |
|---|---|---|
| JP | 2005-250671 | 9/2005 |

*Primary Examiner*—Raymond N Phan
(74) *Attorney, Agent, or Firm*—Oblon, Spivak, McClelland, Maier & Neustadt, L.L.P.

(57) ABSTRACT

In a communication system, one of a plurality of communication apparatuses that acts as a host controls data transmission and the other communication apparatuses that act as devices perform data transmission under control of the host over a predetermined communication interface. The communication apparatuses have both host and device roles, and are configured to exchange the host and device roles by using a predetermined communication protocol are connected to the predetermined communication interface. A first apparatus acts as a host and a second apparatus as a device. The second apparatus transmits information concerning the second apparatus to the first apparatus. The first apparatus compares the transmitted information with information concerning the first apparatus to determine whether or not to switch the host and device roles according to a predetermined criterion. In response to an affirmative determination, the host and device roles are switched by using the predetermined communication protocol.

22 Claims, 12 Drawing Sheets

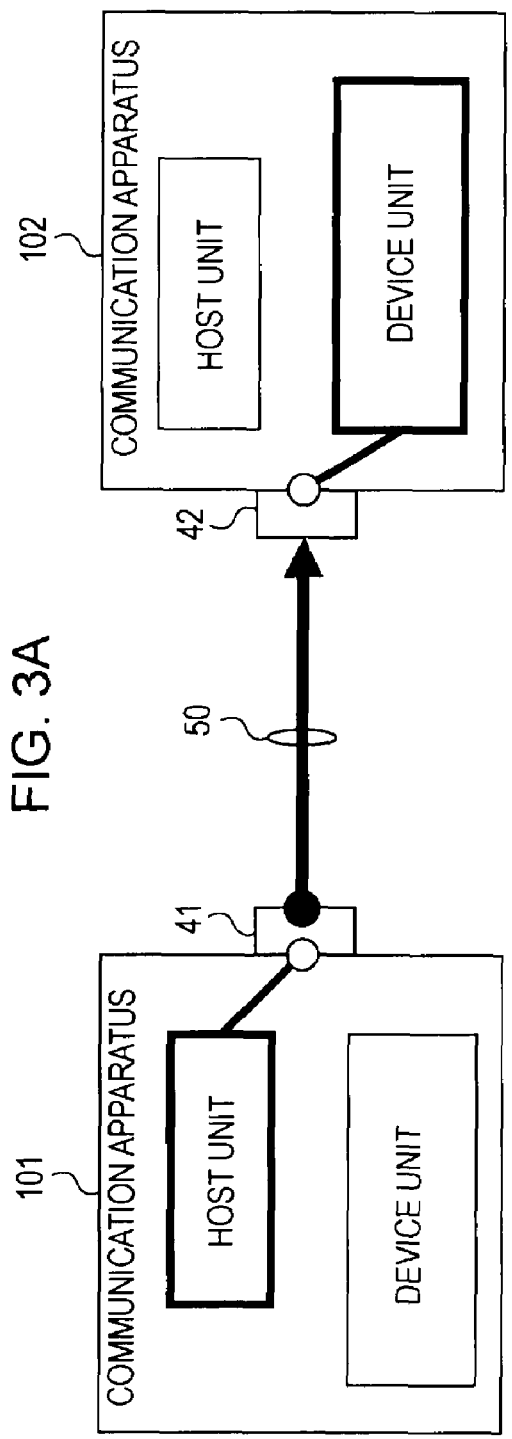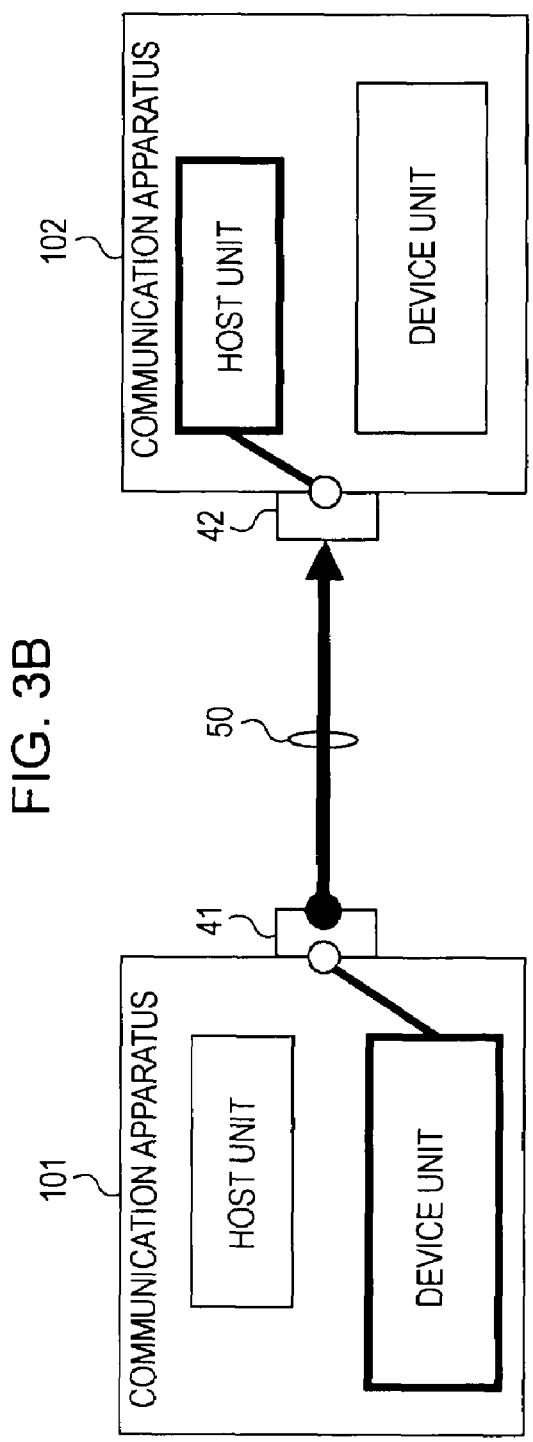

FIG. 5

| OFFSET | SIZE [BYTE] | FIELD |
| --- | --- | --- |
| 0 | 1 | DESCRIPTOR LENGTH |
| 1 | 1 | DESCRIPTOR TYPE |
| 2 | 1 | DESCRIPTOR INDEX |
| 3 | 4 | HARDWARE VERSION INFORMATION |
| 7 | 4 | FIRMWARE VERSION INFORMATION |
| 11 | 1 | TYPE OF INPUT DEVICE (OPERATION UNIT) |
| 12 | 1 | TYPE OF RESOLUTION OF OUTPUT DEVICE (DISPLAY UNIT) |
| 13 | 1 | SIZE (INCH) OF OUTPUT DEVICE (DISPLAY UNIT) |
| 14 | 1 | AMOUNT OF INFORMATION (BIT) PER PIXEL OF OUTPUT DEVICE (DISPLAY UNIT) |

FIG. 6

| TYPE OF INPUT DEVICE (OPERATION UNIT) | INPUT DEVICE |
|---|---|
| 0×00 | DEDICATED HARDWARE KEYS |
| 0×01 | TOUCH PANEL |
| 0×02 | FULL KEYBOARD |
| 0×03 | MOUSE |
| 0×04 | JOYSTICK |
| 0×05 | JOG DIAL |
| 0×06 | TABLET |
| 0×07 | AUDIO INPUT |
| 0×08 - 0×FF | UNDEFINED |

FIG. 7

| TYPE OF RESOLUTION | SCREEN RESOLUTION (LENGTH BY WIDTH) |
|---|---|
| 0×00 | 128 × 96 |
| 0×01 | 176 × 144 |
| 0×02 | 320 × 180 |
| 0×03 | 320 × 240 |
| 0×04 | 400 × 240 |
| 0×05 | 352 × 288 |
| 0×06 | 640 × 400 |
| 0×07 | 640 × 480 |
| 0×08 | 800 × 480 |
| 0×09 | 768 × 576 |
| 0×0A | 800 × 600 |
| 0×0B | 1024 × 480 |
| 0×0C | 1024 × 600 |
| 0×0D | 1088 × 612 |
| 0×0E | 1152 × 648 |
| 0×0F | 1280 × 600 |
| 0×10 | 1024 × 768 |
| 0×11 | 1280 × 768 |
| 0×12 | 1152 × 864 |
| 0×13 | 1280 × 768 |
| 0×14 | 1280 × 960 |
| 0×15 | 1440 × 900 |
| 0×16 | 1280 × 1024 |
| 0×17 | 1600 × 900 |
| 0×18 | 1400 × 1050 |
| 0×19 | 1680 × 1050 |
| 0×1A | 1600 × 1200 |
| 0×1B | 1920 × 1080 |
| 0×1C | 2048 × 1080 |
| 0×1D | 1920 × 1200 |
| 0×1E | 2048 × 1152 |
| 0×1F | 2048 × 1536 |
| 0×20 | 2304 × 1728 |
| 0×21 | 2560 × 1600 |
| 0×22 | 3200 × 2400 |
| 0×23 | 4096 × 2160 |
| 0×24 | 3840 × 2400 |
| 0×25 - 0×FF | UNDEFINED |

FIG. 8

A-DEVICE

| OFFSET | SIZE [BYTE] | FIELD |
|---|---|---|
| 0 | 1 | 0×0F |
| 1 | 1 | 0×80 |
| 2 | 1 | 0×00 |
| 3 | 4 | 0×00010000 |
| 7 | 4 | 0×00040100 |
| 11 | 1 | 0×00 |
| 12 | 1 | 0×03 |
| 13 | 1 | 0×02 |
| 14 | 1 | 0×18 |

B-DEVICE

| OFFSET | SIZE [BYTE] | FIELD |
|---|---|---|
| 0 | 1 | 0×0F |
| 1 | 1 | 0×80 |
| 2 | 1 | 0×00 |
| 3 | 4 | 0×00010100 |
| 7 | 4 | 0×00100500 |
| 11 | 1 | 0×01 |
| 12 | 1 | 0×07 |
| 13 | 1 | 0×02 |
| 14 | 1 | 0×18 |

FIG. 9

A-DEVICE

| OFFSET | SIZE [BYTE] | FIELD |
|---|---|---|
| 0 | 1 | 0×0F |
| 1 | 1 | 0×80 |
| 2 | 1 | 0×00 |
| 3 | 4 | 0×00010100 |
| 7 | 4 | 0×00060100 |
| 11 | 1 | 0×00 |
| 12 | 1 | 0×03 |
| 13 | 1 | 0×02 |
| 14 | 1 | 0×18 |

B-DEVICE

| OFFSET | SIZE [BYTE] | FIELD |
|---|---|---|
| 0 | 1 | 0×0F |
| 1 | 1 | 0×80 |
| 2 | 1 | 0×00 |
| 3 | 4 | 0×00010100 |
| 7 | 4 | 0×00050800 |
| 11 | 1 | 0×00 |
| 12 | 1 | 0×03 |
| 13 | 1 | 0×02 |
| 14 | 1 | 0×18 |

FIG. 11

| OFFSET | SIZE [BYTE] | FIELD |
|---|---|---|
| 0 | 1 | DESCRIPTOR LENGTH |
| 1 | 1 | DESCRIPTOR TYPE |
| 2 | 1 | DESCRIPTOR INDEX |
| 3 | 1 | READY FOR COMMUNICATION SET 1 IF READY FOR COMMUNICATION; SET 0 OTHERWISE |
| 4 | 1 | ELAPSED TIME (SEC) SINCE CABLE PLUGGED IN, WHERE SET 0×FF FOR 255 SEC OR MORE |
| 5 | 1 | ELAPSED TIME (SEC) SINCE LAST USER OPERATION, WHERE SET 0×FF FOR 255 SEC OR MORE |

FIG. 12

| OFFSET | SIZE [BYTE] | FIELD |
|---|---|---|
| 0 | 1 | 0×06 |
| 1 | 1 | 0×81 |
| 2 | 1 | 0×00 |
| 3 | 1 | 0×1 |
| 4 | 1 | 0×20 |
| 5 | 1 | 0×FF |

COMMUNICATION SYSTEM, COMMUNICATION APPARATUS, CONTROL METHOD THEREFOR, AND COMPUTER PROGRAM

CROSS REFERENCES TO RELATED APPLICATIONS

The present invention contains subject matter related to Japanese Patent Application JP 2007-167617 filed in the Japanese Patent Office on Jun. 26, 2007, the entire contents of which are incorporated herein by reference.

BACKGROUND OF THE INVENTION

1. Field of the Invention

The present invention relates to a communication system, a communication apparatus, a control method therefor, and a computer program in which a plurality of devices perform data transmission over a predetermined communication interface, and in particular to a communication system, a communication apparatus, a control method therefor, and a computer program in which one of the devices acts as a "host" and controls data transmission over the communication interface while the other devices acts as "devices" and perform data transmission over the communication interface under control of the host.

More specifically, the present invention relates to a communication system, a communication apparatus, a control method therefor, and a computer program in which dual-role communication devices having both host and device roles easily perform the host and device roles in an environment where a fixed host such as a personal computer (PC) is not present, and in particular to a communication system, a communication apparatus, a control method therefor, and a computer program in which communication devices that are initially designated as a host and a device exchange their host and device roles according to a predetermined communication protocol.

2. Description of the Related Art

Universal serial bus (USB) is a general-purpose bus interface standard supporting plug-and-play, which can replace legacy ports such as serial (RS-232C) and parallel ports. The USB specification was originally developed by four companies such as Intel Corporation, and is now developed and managed by a non-profit organization called USB Implementers Forum, Inc. (USB-IF). USB 2.0 whose specification provides High-Speed mode (up to 480 megabits per second (Mbps)), which is higher than IEEE 1394 transfer rates (up to 400 Mbps), has been widespread.

In USB, specifications called USB classes, which are grouped in accordance with capabilities of peripheral devices, are defined. Devices created according to each class specification provide the same function, and class-compliant devices are operated by a class driver without using driver software specific to each device.

USB is originally a transmission scheme based on wire cables, in which a plurality of devices are connected via a common serial communication bus to construct a USB communication system. Recently, an extension of USB into wireless communication, called "Wireless USB (WUSB)", in which advantages of wired communication, such as safe and high-speed communication, and advantages of wireless communication, such as easy-to-use communication, are combined have been being developed. WUSB is based on Ultra Wide Band (UWB) technology, which is a wireless technology using an ultra wideband, and adopts a multiband orthogonal frequency division multiplexing (OFDM) system, which is promoted by the WiMedia Alliance, as a standard of the physical layer and media access control (MAC) layer. WUSB supports communication at rates up to 480 Mbps for a three-meter communication range and up to 110 Mbps for a ten-meter communication range, and allows up to 127 devices to be connected to one host by using a star topology.

In a USB communication system, one of a plurality of USB-connected devices achieves a function called "host" and the other devices achieve a function called "device" (although "device" may also be referred to as "function" or "peripheral", "device" is used throughout this specification). In a wired USB system, a USB cable has an asymmetrical structure having an "A-plug" at an end thereof for connection to a host and a "B-plug" at the other end thereof for connection to a device. In this case, since a device into which the A-plug is plugged acts as a host and a device into which the B-plug is plugged acts as a device, the relationship between the host and the device is fixed.

A host serves to control overall data transmission over a USB interface, and a PC usually acts as a host. The host performs processing such as detecting a new USB-connected device and managing the flow of data over a bus. Devices, on the other hand, perform communication under control of the host. The devices communicate with only a host.

Basically, a host schedules USB-based communication and initiates the communication, and a device responds to the initiation of the communication. Specifically, a host delivers a request to a device, and the device responds to the request, thereby performing communication. The device transfers its information to the host or transmits and receives data to and from the host according to a response to requests from the host.

USB has been widespread as a technology for establishing a connection between, for example, a PC acting as a host and a peripheral device such as a printer acting as a device, and has become the de-facto industry standard. With the recent appearance of various USB-compatible peripheral devices, a demand for connection between such peripheral devices without the intervention of a PC has increased.

To meet the demand, USB On-The-Go (hereinafter referred to as "OTG"), which is a supplement to USB 2.0, has been developed. OTG allows a USB 2.0 host controller function to be definitely added to a non-host device such as a digital camera so that data can be directly transmitted between peripheral devices.

In a case where a PC and a peripheral device are connected using a USB interface, the host-device relationship is fixed; the PC acts as a host and the peripheral device acts as a device. The host-device relationship is also uniquely determined from the type of plugs of a USB cable (described above). In a case where peripheral devices are directly connected, however, it is desirable to flexibly determine the host and device roles between USB-connected devices such that, for example, a digital camera acts as a device when it is connected to a PC, and acts as a host when it performs direct printing to a printer.

In OTG, a dual role device (DRD) is defined as a device having both host and device functions. DRDs determine initial functions (host and device) according to the type of plugs of a USB cable connected to the DRDs. An OTG-compatible USB cable has an asymmetrical structure having a plug called Mini-A at an end thereof and a plug called Mini-B at the other end thereof. A Mini-A plugged device is initially a host, and a Mini-B plugged device is initially a device. A Mini-A plugged device is referred to as an "A-device", and a Mini-B plugged device is referred to as a "B-device".

OTG introduces communication protocols called Session Request Protocol (SRP) and Host Negotiation Protocol (HNP) in addition to the USB 2.0 communication protocol.

The A-device, defined in OTG, is allowed to stop the supply of current to a USB bus during a non-communication period. SRP is a communication protocol for allowing restart of the supply of current from the B-device to the A-device during a period in which the supply of current is stopped. By using SRP, the A-device is allowed to stop the supply of current to the USB bus until a request is issued from the B-device, resulting in a reduction in power consumption during the non-communication period.

Two DRDs connected to an OTG-compatible USB cable initially determine their host and device roles according to the type of plugs of the cable plugged into the DRDs (described above). HNP is a communication protocol for reversing the host and device roles without replugging the cable when one of the DRDs acts as a host and the other acts as a device. It is therefore unnecessary to replug the cable, resulting in improvement of user convenience.

By using OTG, data can be exchanged directly between peripheral devices without the intervention of a PC, such as between a digital camera or a scanner and a printer, between a mobile phone and a portable music player or a memory card reader, and between a personal digital assistant (PDA) and a hard disk drive or a magneto optical (MO) drive. For example, a PDA and a mobile phone may be USB-connected so that the PDA can be connected to the Internet, or a portable music player and a mobile phone may be USB-connected so that music files can be downloaded to the portable music player via the Internet. Further, a digital camera and a printer may be directly connected using a USB cable to perform "direct printing".

One of communication standards that allow a digital camera and a printer to be USB-connected to perform direct printing is "PictBridge", which was established by the Camera & Imaging Products Association (CIPA). PictBridge-compatible devices can perform direct printing without installing special software once they are connected using a USB cable. A user can operate buttons or the like of a digital camera to easily print an image being displayed on a liquid crystal monitor of the digital camera. The digital camera has capabilities of, besides specifying print setting (such as paper size), printing an image using printer default settings if no settings are specified for that image. Other various capabilities as well as printing a specified image, such as index printing in which a list of thumbnail images is printed, printing a plurality of copies of the same image, and printing an image stamped with date, are also utilized. If an event such as an error occurs during printing, an error warning may be displayed on the liquid crystal monitor or the like of the digital camera.

In USB communication, users may enter instructions such as start or end of communication and various settings not only via a user interface (a touch panel, a keyboard, or any other input device) on the host side but also via a user interface on the device side. This is to be understood from an example in which in the PictBridge standard described above, a printing instruction can be issued from a digital camera behaving as a device to a printer acting as a host, and is based on a communication protocol established between devices that are USB-connected according to the OTG standard.

In other words, a special communication protocol is used to transmit a certain command to the host by operating a user interface on the device side to instruct USB communication. Therefore, it is more effective in view of light communication load and easy design of devices that the host instructs USB communication unless special purposes exist. It is common to perform various USB communication operations via a user interface of a host device.

It is now assumed that a communication apparatus that is USB-connected to a DRD is a DRD having a host controller function, that is, DRDs are USB-connected.

The two DRDs are denoted by devices 1 and 2. The device 1, when acting as a host, supports devices that are generally different from those supported by the device 2 when acting as a host. However, if the devices 1 and 2 support each other (that is, if one of the devices 1 and 2 is provided with a device driver of the other device and vice versa), the A-device into which the Mini-A plug of the USB cable is plugged can performs the host function without changing its initial function.

If various USB communication operations are to be performed via a user interface on the host device, however, it is desirable to determine to which of the devices 1 and 2 to assign the host function by taking into account the operability of input devices, output devices, and other devices provided in the respective devices.

In a case where a USB communication system is established in which the A-device into which the Mini-A plug is plugged still acts as a host without changing its initial role, the connection direction of the USB cable (that is, which device to plug each of the Mini-A plug and Mini-B plug into) has no relationship with the operability of the user interfaces of the devices, and a desired one of the devices is not necessarily designated as a host. Since the A-device still acts as a host and performs USB communication operations, even if the B-device is higher in operability than the A-device, this characteristic may not be utilized.

Furthermore, it is not practical for users having no special knowledge of USB technology to correctly determine the connection direction of the USB cable by taking the operability of the devices 1 and 2 into account or to replug the USB cable when the host device is low in operability.

Even USB-connected devices of the same type may differ in operability or host-specific communication performance if the devices have different firmware versions. There may still arise a problem in that the operability of the host and the connection direction of the USB cable do not coincide with each other, and users may not enjoy the benefit of device's operability, which is higher than that of the host, and communication stability.

The problems caused by the A-device implementing the host function without changing its initial role are not limited to unsuitability for the physical operability of the devices.

It is difficult to plug the plug terminals at the ends of the USB cable into two devices at the same time. A user generally plugs in sequence one of the plugs into a desired device. When USB communication is enabled between the devices to which the USB cable is connected, the device plugged later may possibly be still held with the user's hand or may possibly be near the user. It is therefore convenient due to reduced time spent on user's movement or the like that USB communication operations be performed using the device plugged later (in other words, the host function be assigned to the device plugged later).

It is also convenient due to reduced time spent on user's movement or the like that USB communication operations be performed using a device whose user interface has been operated by a user or a device that has been moved around the user because such a device may be nearer the user.

It is also convenient due to reduced time spent on user's movement or the like that USB communication operations be performed using one of two USB-connected devices that has an application operating thereon for performing USB communication or that is being prepared for USB communication because the user may possibly desire to operate this device.

Accordingly, it is desirable that a device whose user interface for USB communication is operated, that is, a device to which the host function is assigned, be determined according to user convenience based on individual use conditions or the statuses of the devices. However, the determined device may not coincide with a device that is determined on the basis of the connection direction of the USB cable.

For example, a communication system in which connected DRDs exchange their host and device roles on the basis of communication capabilities of the DRDs to improve communication performance is disclosed in, for example, Japanese Unexamined Patent Application Publication No. 2005-250671. The disclosed communication system is designed to switch the host and device roles between USB-connected DRDs to reduce power consumption or improve communication rates, but is not configured to determine a host by taking into account the operability of the user interfaces of the USB-connected devices or user convenience for entering instructions relating to USB communication. Thus, the foregoing problem is not overcome.

Further, an image output system configured to switch the host and device roles according to HNP when the connection direction of two USB-connected DRDs is wrong is disclosed in, for example, Japanese Unexamined Patent Application Publication No. 2004-316072. The disclosed system is not configured to determine a host by taking into account the operability of the user interfaces of the USB-connected devices or the user convenience for entering instructions relating to USB communication. Thus, the foregoing problem is not overcome.

SUMMARY OF THE INVENTION

It is therefore desirable to provide a communication system, a communication apparatus, a control method therefor, and a computer program in which a device acting as a host can control data transmission over a communication interface while another device acting as a device can perform data transmission over the communication interface under control of the host.

It is also desirable to provide a communication system, a communication apparatus, a control method therefor, and a computer program in which communication devices having both host and device roles can easily perform the host and device roles in an environment where a fixed host such as a PC is not present.

It is further desirable to provide a communication system, a communication apparatus, a control method therefor, and a computer program in which communication devices that are initially designated as a host and a device can exchange their host and device roles according to a predetermined communication protocol.

It is further desirable to provide a communication system, a communication apparatus, a control method therefor, and a computer program in which USB-connected devices can suitably exchange their host and device roles, regardless of the initially set host and device roles, by taking into account the operability of user interfaces of the devices or the user convenience for entering instructions relating to USB communication.

In a first embodiment of the present invention, there is provided a communication system including a plurality of communication apparatuses configured to perform data transmission over a predetermined communication interface that allows one of the communication apparatuses to act as a host and to control data transmission and that allows the other communication apparatuses to act as devices and to perform data transmission under control of the host. The plurality of communication apparatuses includes a first communication apparatus and a second communication apparatus, the first communication apparatus and the second communication apparatus being connected to the predetermined communication interface, and each of the first communication apparatus and the second communication apparatus has both host and device roles. The first communication apparatus and the second communication apparatus are configured to exchange the host and device roles by using a predetermined communication protocol. When the first communication apparatus is designated as the host and the second communication apparatus is designated as one of the devices, the communication system further includes apparatus-information transmitting means for transmitting apparatus information relating to a structure or specific information of the second communication apparatus to the first communication apparatus; determining means for determining whether or not to switch the host and device roles between the first communication apparatus and the second communication apparatus according to a predetermined criterion when the first communication apparatus compares the apparatus information transmitted by the second communication apparatus with apparatus information relating to a structure or specific information of the first communication apparatus; and switching procedure executing means for executing a procedure for switching the host and device roles between the first communication apparatus and the second communication apparatus by using the predetermined communication protocol when an affirmative determination result is obtained from the determining means.

The term system as used herein refers to a logical set of apparatuses (or function modules implementing specific functions) regardless of whether or not the apparatuses or function modules are housed in a single housing.

USB interfaces are de-facto industry standard communication interfaces for establishing a connection between a PC and a peripheral device. Recently, to meet a demand for USB connection between peripheral devices without the intervention of a PC, USB On-The-Go (hereinafter referred to as "OTG"), which is a supplement to USB 2.0, has been developed.

In OTG, a DRD is defined as a device having both host and device functions. When DRDs are connected via a USB cable, the relationship between a host and a device is initially determined according to the communication direction of the USB cable (the type of plugs plugged into the devices). Afterwards, the host and device roles can be switched by using HNP.

In a case where two devices are connected via a USB cable, it is common to perform various USB communication operations via a user interface of a host. However, users having poor knowledge about the USB standard may not correctly connect the communication cable by taking into account the operability of the devices or the user convenience based on individual use conditions or the statuses of the devices, and a device that is initially designated a host is not necessarily suitable as a host.

In the communication system according to the first embodiment of the present invention, when the first and second communication apparatuses, which are DRDs, are connected via a USB cable and the first communication apparatus is initially designated as a host according to the connection direction of the USB cable or the like, the determining means compares an apparatus structure or apparatus specific information stored in the first communication apparatus with an apparatus structure or apparatus specific information stored in the second communication apparatus according to a predetermined criterion to determine whether or not to switch the host and device roles between the first and second communication apparatuses. If an affirmative determination result is obtained, the host and device roles are switched between the first and second communication apparatuses by using HNP.

According to the first embodiment of the present invention, therefore, the host/device roles can be switched to automatically assign the optimal roles so as to improve operability for a user and to reduce the operational load imposed on the user, such as changing of devices or movement to another place, without forcing the user to replug the USB cable, resulting in improvement of user convenience using USB communication.

The determining means may determine whether or not to switch the host and device roles between the first and second communication apparatuses according to a predetermined criterion that is based on an improvement in user operability or an improvement in user convenience.

The apparatus information transmitted by the apparatus information transmitting means may include, for example, hardware version information or software version information of the corresponding communication apparatus. In a case where the connected communication apparatuses are of the same type, a communication apparatus having a newer version can be possibly have higher in operability, functionality, communication stability, etc. Thus, it may be more advantageous for a user to operate a device with newer version information as a host.

Further, the apparatus information transmitted by the apparatus information transmitting means may include, for example, information relating to an output device or input device included in the corresponding communication apparatus. The representation performance of a display unit serving as the output device increases as the screen resolution, or the amount of information per pixel, increases. It is therefore more advantageous for a user to operate a device having a higher screen resolution as a host. Further, it is desirable that a device equipped with an input device of a type having a higher operability be designated as a host.

In a second embodiment of the present invention, there is provided a communication system including a plurality of communication apparatuses configured to perform data transmission over a predetermined communication interface that allows one of the communication apparatuses to act as a host and to control data transmission and that allows the other communication apparatuses to act as devices and to perform data transmission under control of the host. The plurality of communication apparatuses includes a first communication apparatus and a second communication apparatus, the first communication apparatus and the second communication apparatus being connected to the predetermined communication interface, and each of the first communication apparatus and the second communication apparatus has both host and device roles. The first communication apparatus and the second communication apparatus are configured to exchange the host and device roles by using a predetermined communication protocol. When the first communication apparatus is designated as the host and the second communication apparatus is designated as the device, the communication system further includes apparatus-status-information transmitting means for transmitting apparatus-status information relating to a status of the second communication apparatus to the first communication apparatus; determining means for determining whether or not to switch the host and device roles between the first communication apparatus and the second communication apparatus according to a predetermined criterion when the first communication apparatus compares the apparatus-status information transmitted by the second communication apparatus with apparatus-status information relating to a status of the first communication apparatus; and switching procedure executing means for executing a procedure for switching the host and device roles between the first communication apparatus and the second communication apparatus by using the predetermined communication protocol when an affirmative determination result is obtained from the determining means.

The problems caused by the device, which is initially designated as a host according to the connection direction of the USB, still implementing the host function without changing its initial role are not limited to unsuitability for the physical operability of the devices. To address those problems, the communication system according to the second embodiment of the present invention is configured to change the host function to a suitable device by taking into account the operability of USB-connected device or the user convenience based on the individual use conditions or the statuses of the devices.

Also in the communication system according to the second embodiment of the present invention, the determining means may determine whether or not to switch the host and device roles between the first and second communication apparatuses according to a predetermined criterion that is based on an improvement in user operability or an improvement in user convenience.

The apparatus-status information transmitted by the apparatus-status-information transmitting means may include, for example, information indicating whether or not the corresponding communication apparatus is ready to perform communication, and a status of an application operating on the communication apparatus. In a case where a copy of data or the like is transferred between two communication apparatuses, in a situation where either apparatus is available for a communication operation, a user might possibly desire to operate one of the apparatuses that has an application operating thereon for copying data. That is, higher user convenience is obtained by operating the apparatus that is ready for communication. Therefore, it is desirable that the communication apparatus that has been prepared for communication be designated as a host.

Further, the apparatus-status information transmitted by the apparatus-status-information transmitting means may include, for example, information relating to a time that has elapsed since the corresponding communication apparatus was connected to the predetermined communication interface (that is, a USB cable). A user generally connects the communication cable to one of the communication apparatuses in sequence. The later connected communication apparatus may possibly be held with the user's hand or may possibly be near the user. The operation on the later connected communication apparatus would provide higher convenience due to reduced time spent on changing of the apparatuses, user's movement, or the like. Therefore, it is desirable that the apparatus having information of less elapsed time since the cable was plugged in be designated as a host.

Further, the apparatus-status information transmitted by the apparatus-status-information transmitting means may include, for example, information relating to a time that has elapsed since the last time a user operated the corresponding communication apparatus. The communication apparatus that was operated by the user later may possibly be held with the user's hand or may possibly be near the user. Therefore, it is desirable that the apparatus having information of less elapsed time since last user operation be designated as a host.

In a third embodiment of the present invention, there is provided a computer-readable computer program for performing control of a communication apparatus on a computer, the communication apparatus being configured to perform a communication operation over a predetermined communication interface that allows one of a plurality of communication apparatuses to act as a host and to control data transmission and that allows the other communication apparatuses to act as devices and to perform data transmission under control of the host, the communication apparatus having both host and device roles, the predetermined communication interface being specified by a predetermined communication protocol for switching the host and device roles between the communication apparatuses. The computer program causing the computer to execute the steps of transmitting, when the communication apparatus is designated as the device, apparatus information relating to a structure or specific information of the communication apparatus to a communication apparatus acting as the host over the predetermined communication interface; receiving, when the communication apparatus is designated as the host, the apparatus information from a second communication apparatus acting as the device over the predetermined communication interface; comparing, when the communication apparatus is designated as the host, the apparatus information transmitted by the second communication apparatus with the apparatus information relating to a structure or specific information of the communication apparatus to determine whether or not to switch the host and device roles between the communication apparatus and the second communication apparatus according to a predetermined criterion; and executing, when an affirmative determination result is obtained, a procedure for switching the host and device roles between the communication apparatus and the second communication apparatus by suing the predetermined communication protocol.

In a fourth embodiment of the present invention, there is provided a computer-readable computer program for performing control of a communication apparatus on a computer, the communication apparatus being configured to perform a communication operation over a predetermined communication interface that allows one of a plurality of communication apparatuses to act as a host and to control data transmission and that allows the other communication apparatuses to act as devices and to perform data transmission under control of the host, the communication apparatus having both host and device roles, the predetermined communication interface being specified by a predetermined communication protocol for switching the host and device roles between the communication apparatuses. The computer program causing the computer to execute the steps of transmitting, when the communication apparatus is designated as the device, apparatus-status information relating to a status of the communication apparatus to a communication apparatus acting as the host over the predetermined communication interface; receiving, when the communication apparatus is designated as the host, the apparatus-status information from a second communication apparatus acting as the device over the predetermined communication interface; comparing, when the communication apparatus is designated as the host, the apparatus-status information transmitted by the second communication apparatus with apparatus-status information relating to a status of the communication apparatus to determine whether or not to switch the host and device roles between the communication apparatus and the second communication apparatus according to a predetermined criterion; and executing, when an affirmative determination result is obtained, a procedure for switching the host and device roles between the communication apparatus and the second communication apparatus by suing the predetermined communication protocol.

The computer program according to the third and fourth embodiments of the present invention defines a computer program written in a computer-readable manner so as to implement predetermined processing on a computer. In other words, the computer program according to the third and fourth embodiments of the present invention is installed in a computer to exert a cooperative effect on the computer to cause the computer to operate as the first or second communication apparatus. By connecting such communication apparatuses via a predetermined communication interface such as a USB interface, advantages similar to those of the communication system according to the first to second embodiments of the present invention can be achieved.

According to an embodiment of the present invention, a communication system, a communication apparatus, a control method therefor, and a computer program in which communication devices having both host and device roles can easily perform the host and device roles in an environment where a fixed host such as a PC is not present can be achieved.

According to another embodiment of the present invention, a communication system, a communication apparatus, a control method therefor, and a computer program in which communication devices that are initially designated as a host and a device can exchange their host and device roles according to a predetermined communication protocol can be achieved.

According to another embodiment of the present invention, a communication system, a communication apparatus, a control method therefor, and a computer program in which USB-connected devices can suitably exchange their host and device roles, regardless of the initially set host and device roles, by taking into account the operability of user interfaces of the devices or the user convenience for entering instructions relating to USB communication can be achieved.

According to another embodiment of the present invention, when OTG-compatible DRDs are connected, the host/device roles are not determined merely according to the direction of the USB cable, but the functions can be switched to automatically assign the optimal roles so as to improve operability for a user and to reduce the operational load imposed on the user, such as changing of devices or movement to another place.

The communication system according to the embodiments of the present invention can be configured to perform control by using a method complying with the USB 2.0 and OTG standards, and can be easily applied to devices compatible with those standards. Such control can also be implemented by executing a predetermined software program on a computer. Thus, the functions of the embodiments of the present invention can be implemented only by modifying the program without changing the hardware configuration of the devices.

Further features and advantages of the present invention will become apparent from the following detailed description of the preferred embodiments of the present invention taken in conjunction with the accompanying drawings.

BRIEF DESCRIPTION OF THE DRAWINGS

FIG. 3A is a diagram showing switching of host and device roles between the communication processing unit in the first communication apparatus and a communication processing unit in a second communication apparatus (wherein the first communication apparatus acts as a host and a second communication apparatus acts as a device);

FIG. 3B is a diagram showing switching of host and device roles between the communication processing units (wherein the first communication apparatus acts as a device and the second communication apparatus acts as a host);

FIG. 5 is a diagram showing an example of the data structure of an 'OTG Device Information' descriptor;

FIG. 6 is a diagram showing an example of the correspondence between values stored in a 'type of input device (operation unit)' field of the 'OTG Device Information' descriptor and types of input devices;

FIG. 7 is a diagram showing an example of the correspondence between values stored in a 'type of resolution of output device (display unit)' field of the 'OTG Device Information' descriptor and screen resolutions of output devices;

FIG. 8 is a diagram showing a specific example of 'OTG Device Information' descriptors of the A-device and B-device in a case where two USB-connected communication apparatuses are of different types;

FIG. 9 is a diagram showing a specific example of 'OTG Device Information' descriptors of the A-device and B-device in a case where two USB-connected communication apparatuses are of the same type;

FIG. 11 is a diagram showing an example of the data structure of an 'OTG Device Status' descriptor; and FIG. 12 is a diagram showing a specific example of an 'OTG Device Status' descriptor of the B-device (the second communication apparatus).

DESCRIPTION OF THE PREFERRED EMBODIMENTS

Embodiments of the present invention will be described in detail hereinafter with reference to the drawings.

Figure 1:
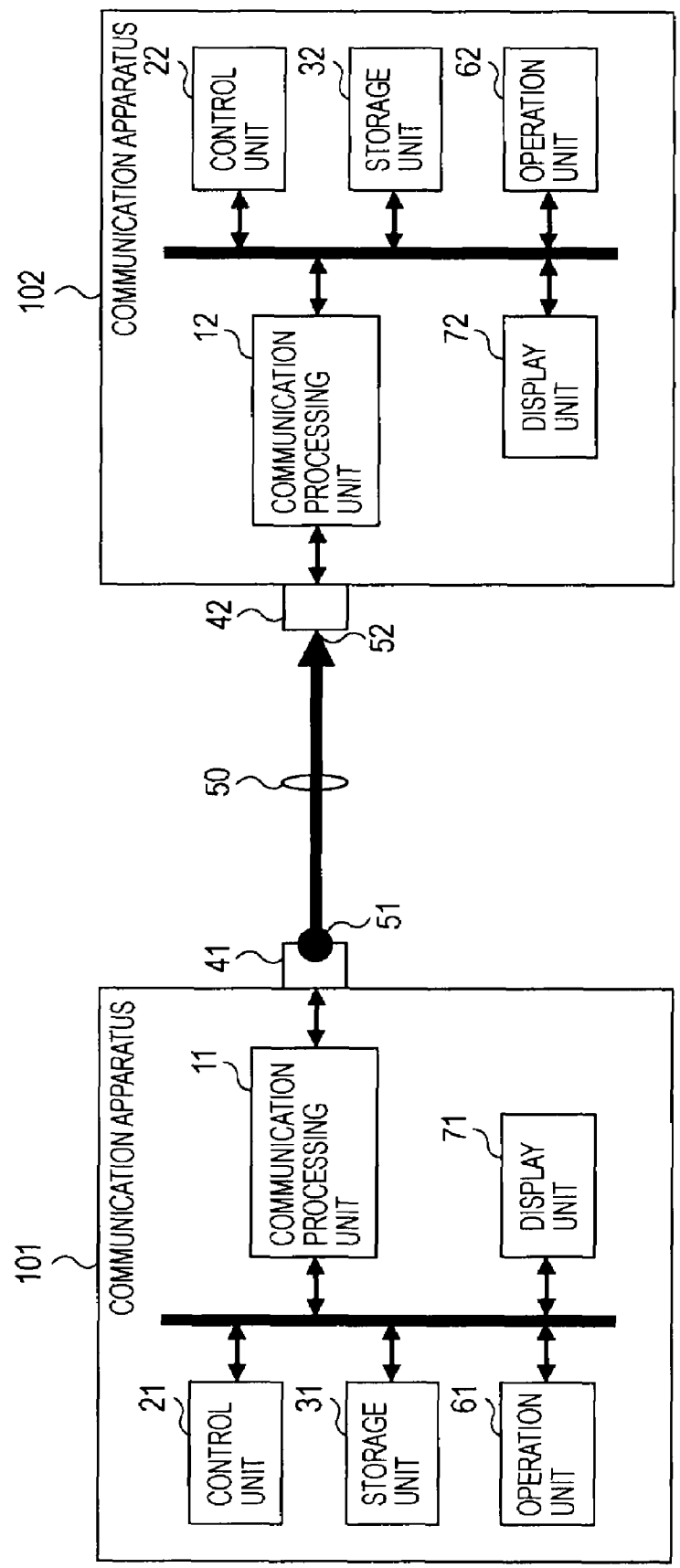
FIG. 1 is a schematic block diagram showing a structure of a communication system according to an embodiment of the present invention.

FIG. 1 schematically shows a structure of a communication system according to an embodiment of the present invention. The system includes a communication cable 50 and communication apparatuses 101 and 102. As described below, the communication apparatuses 101 and 102 are DRDs defined in OTG, which is a supplement to USB 2.0.

As shown in FIG. 1, the communication apparatus 101 includes a communication processing unit 11, a control unit 21, a storage unit 31, an operation unit 61, a display unit 71, and a receptacle terminal 41. The communication apparatus 102 includes a communication processing unit 12, a control unit 22, a storage unit 32, an operation unit 62, a display unit 72, and a receptacle terminal 42. Those components will now be described.

The communication cable 50 is an OTG-compatible communication cable, and has a Mini-A plug terminal 51 at an end thereof and a Mini-B plug terminal 52 at the other end thereof.

The communication apparatuses 101 and 102 are DRDs defined in OTG, and are provided with the receptacle terminals 41 and 42, respectively. The receptacle terminals 41 and 42 are OTG-specified DRD terminals, and are "Mini-AB receptacle terminals" to which either the Mini-A or Mini-B plug terminal is attachable.

The communication apparatuses 101 and 102 initially determine host/device roles according to the connection direction of the communication cable 50. Specifically, the communication apparatus 101 or 102 initially acts as the A-device or a host when the Mini-A plug terminal 51 is connected to the receptacle terminal 41 or 42, and initially acts as the B-device or a device when the Mini-B plug terminal 52 is connected to the receptacle terminal 41 or 42.

In the example shown in FIG. 1, the Mini-A plug terminal 51 is plugged into the receptacle terminal 41 of the communication apparatus 101, and the Mini-B plug terminal 52 is plugged into the receptacle terminal 42 of the communication apparatus 102. In the illustrated example, therefore, the communication apparatus 101 initially acts as the A-device or a host, and the communication apparatus 102 initially acts as the B-device or a device.

It is common to perform various USB communication operations via a user interface of one of two USB-connected devices, which acts as a host. However, users having poor knowledge about the USB standard may not correctly connect the communication cable 50 by taking into account the operability of the devices or user convenience based on the individual use conditions or the statuses of the devices, and a device that is initially designated as a host is not necessarily suitable as a host. According to an embodiment of the present invention, the host/device roles can be switched to automatically assign the optimal roles so as to improve operability for a user and to reduce the operational load imposed on the user, such as changing of devices or movement to another place, without forcing the user to replug the communication cable 50. This operation is described in detail below.

The communication processing unit 11 performs various types of USB- and OTG-compliant communication processing according to instructions given by the control unit 21. For example, the communication processing unit 11 transmits and receives data according to the USB specification or switches the host/device roles according to the OTG specification in response to an instruction given by the control unit 21. The communication processing unit 12 has a function to perform, in the communication apparatus 102, operations similar to those of the communication processing unit 11. That is, the communication processing unit 12 performs various types of USB- and OTG-compliant communication processing in response to instructions given by the control unit 22.

Figure 2:
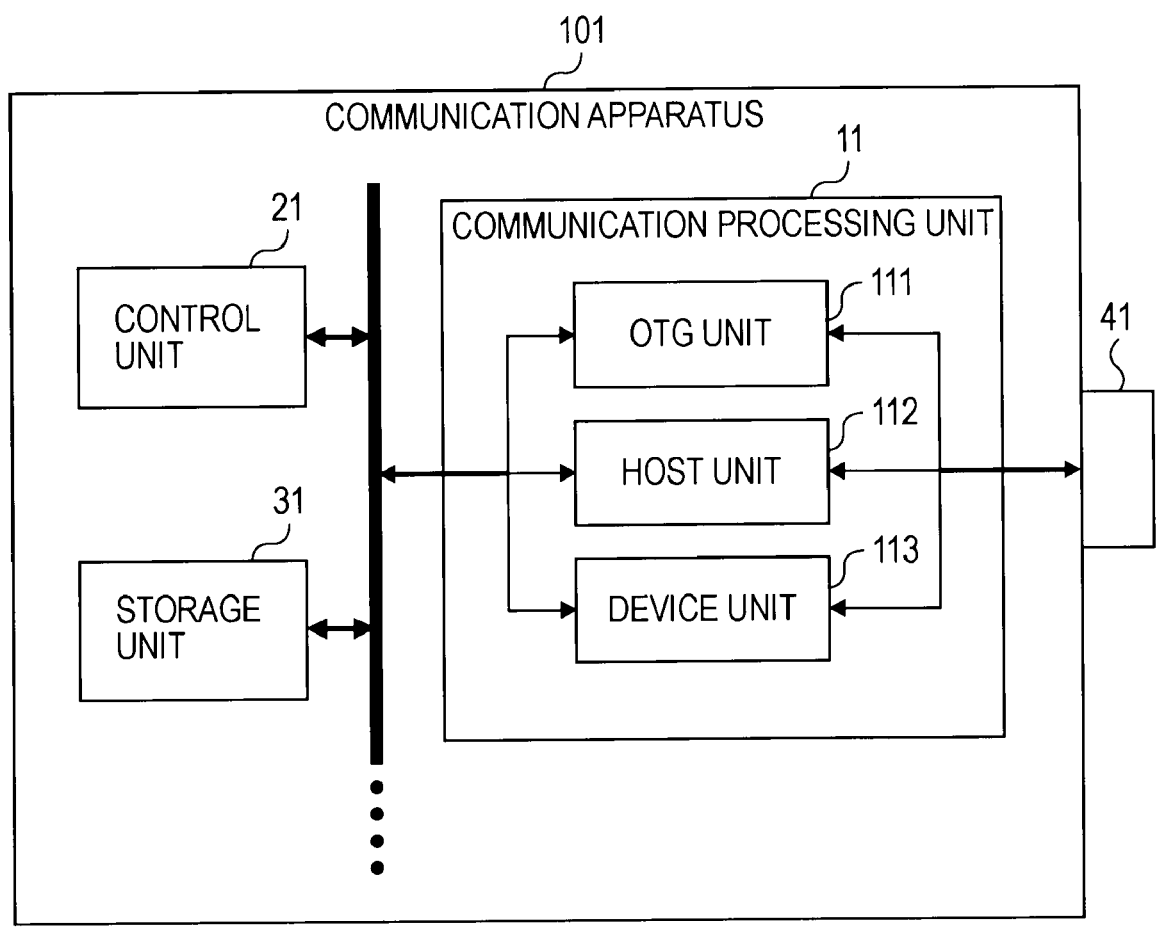
FIG. 2 is a block diagram showing in detail an internal structure of a communication processing unit in a first communication apparatus in the communication system.

FIG. 2 shows an internal structure of the communication processing unit 11 in the communication apparatus 101 in more detail. As shown in FIG. 2, the communication processing unit 11 includes an OTG unit 111, a host unit 112, and a device unit 113. The communication processing unit 12 in the communication apparatus 102 has a structure similar to that shown in FIG. 2.

The OTG unit 111 performs various types of OTG-compliant communication processing. For example, the OTG unit 111 causes the A-device to restart the supply of current by using SRP, or switches the host/device roles between the communication apparatuses 101 and 102 by using HNP. The OTG unit 111 further performs processing such as initially determining the host or device role according to the type of the plug terminal (Mini-A plug terminal or Mini-B plug terminal) plugged into the receptacle terminal 41, that is, the connection direction of the USB cable 50, or controlling the supply of a clock to the host unit 112 and the device unit 113.

The host unit 112 executes communication processing when the communication apparatus 101 acts as a host. That is, the host unit 112 executes USB host-specific communication processing such as detecting another device to which the communication cable 50 is connected or controlling data transmission via the communication cable 50.

The device unit 113 executes communication processing when the communication apparatus 101 acts as a device. That is, the device unit 113 executes USB device-specific communication processing under control of the host.

The OTG unit 111 exclusively supplies a clock to one of the host unit 112 and the device unit 113. The communication processing unit 11 acts as a host when a clock is supplied to the host unit 112, and acts as a device when a clock is supplied to the device unit 113. That is, the communication apparatus 101 is a DRD and is capable of switching the host/device roles according to whether a clock is supplied from the OTG unit 111 to the host unit 112 or the device unit 113 in the communication processing unit 11. The communication apparatus 102 also performs processing similar to that described above.

FIGS. 3A and 3B show switching of the host and device roles between the communication processing units 11 and 12.

In the example shown in FIG. 1, the communication apparatus 101 initially acts as a host and the communication apparatus 102 initially acts as a device. In this case, in the communication processing unit 11, as shown in FIG. 3A, a clock is supplied to the host unit 112 and the supply of a clock to the device unit 113 is stopped under control of the OTG unit 111. In the communication processing unit 12, conversely, a clock is supplied to the device unit and the supply of a clock to the host unit is stopped.

When the host/device roles are switched by using HNP, as shown in FIG. 3B, in the communication processing unit 11, the supply of a clock to the host unit 112 is stopped and the supply of a clock to the device unit 113 is started under control of the OTG unit 111. In the communication processing unit 12, conversely, the supply of a clock to the device unit is stopped and the supply of a clock to the host unit is started. Thus, role switching occurs so that the communication apparatus 101 acts as a device and the communication apparatus 102 acts as a host. The communication apparatuses 101 and 102 exchange their host/device roles without replugging the plug terminals 51 and 52 of the communication cable 50.

The foregoing description has been made in the context of an example in which the communication apparatus 101 is the A-device. In a case where the communication apparatus 102 is the A-device, a procedure similar to that described above is performed to switch the host/device roles.

The control unit 21 performs various types of processing to control the overall operation of the communication apparatus 101. For example, the control unit 21 performs processing for obtaining various types of information necessary for the communication processing unit 11 acting as a host to start communication with a communication partner acting as a device. Specifically, the control unit 21 controls the communication processing unit 11 to transmit various USB requests to the device, and controls the communication processing unit 11 to receive responses to the requests from the device, thereby obtaining information regarding the device. After the necessary information is obtained, the control unit 21 controls the communication processing unit 11 on the basis of the obtained information to communicate with the device.

The control unit 21 further controls the communication processing unit 11 to perform, when the communication processing unit 11 acts as a device, communication under control of a communication partner acting as a host. That is, the control unit 21 controls the communication processing unit 11 to receive a request from the host to generate a USB response to the request, and controls the communication processing unit 11 to transmit the response to the host device.

The control unit 22 has a function to perform, in the communication apparatus 102, operations similar to those of the control unit 21. That is, the control unit 22 performs various types of processing to control the overall operation of the communication apparatus 102 in the manner similar to that described above.

While the communication apparatuses 101 and 102 are DRDs, the A-device determined according to the connection direction of the communication cable 50 is not necessarily suitable as a host in view of its operability or individual use conditions or statuses of devices. In an embodiment of the present invention, the host/device roles can be switched to automatically assign the optimal roles so as to improve operability for a user and to reduce the bothersome operational load imposed on the user, such as changing of devices or movement to another place, without forcing the user to replug the communication cable 50. The control units 21 and 22 play primary roles to implement such functions, the details of which are described below.

The storage unit 31 stores data transmitted and received by the communication processing unit 11 and various types of information necessary for communication processing. Examples of the information stored in the storage unit 31 include a descriptor. The descriptor is data used for the host to obtain information concerning the device, and has a predetermined data structure defined in USB.

The storage unit 32 has a function similar to that of the storage unit 31. That is, the storage unit 32 stores data transmitted and received by the communication processing unit 12 in the communication apparatus 102 and various types of information necessary for communication processing.

The operation unit 61 detects or identifies an instruction entered by the user to perform the operation of the communication apparatus 101, and notifies the control unit 21 of the result. The operation unit 61 is formed of an input device including various operation buttons, a keyboard, a mouse, a touch panel, and a tablet.

The operation unit 62 has a function to perform, in the communication apparatus 102, operations similar to those of the operation unit 61. That is, the operation unit 62 detects or identifies an instruction entered by the user to perform the operation of the communication apparatus 102, and notifies the control unit 22 of the result.

The display unit 71 provides display of a user interface screen or the like of the communication apparatus 101. The display unit 71 is formed of an output device including a display device such as a liquid crystal display, a cathode ray tube (CRT) display, a viewfinder, or a light emitting device (LED) display.

The display unit 72 has a function to perform, in the communication apparatus 102, operations similar to those of the display unit 71. That is, the display unit 72 provides display of a user interface screen or the like of the communication apparatus 102.

In the communication system shown in FIG. 1, the communication apparatuses 101 and 102 are DRDs, and initially determine the host/device roles according to the connection direction of the communication cable 50. In some cases, however, it is not desirable in view of operability of devices or user convenience based on individual use conditions or the statuses of the devices that the A-device still performs the host function without changing its initial role. An embodiment of the present invention provides a solution to a problem caused by assigning the host function to the A-device without changing its initial role. Two embodiments will be described hereinafter.

In either of the embodiments, the control units 21 and 22 in the communication apparatuses 101 and 102 play primary roles. This means that embodiments of the present invention can be implemented by executing a predetermined software program on a computer, and the functions of the embodiments of the present invention can also be implemented merely by mortifying the program without changing the hardware of devices.

First Embodiment

Figure 4:
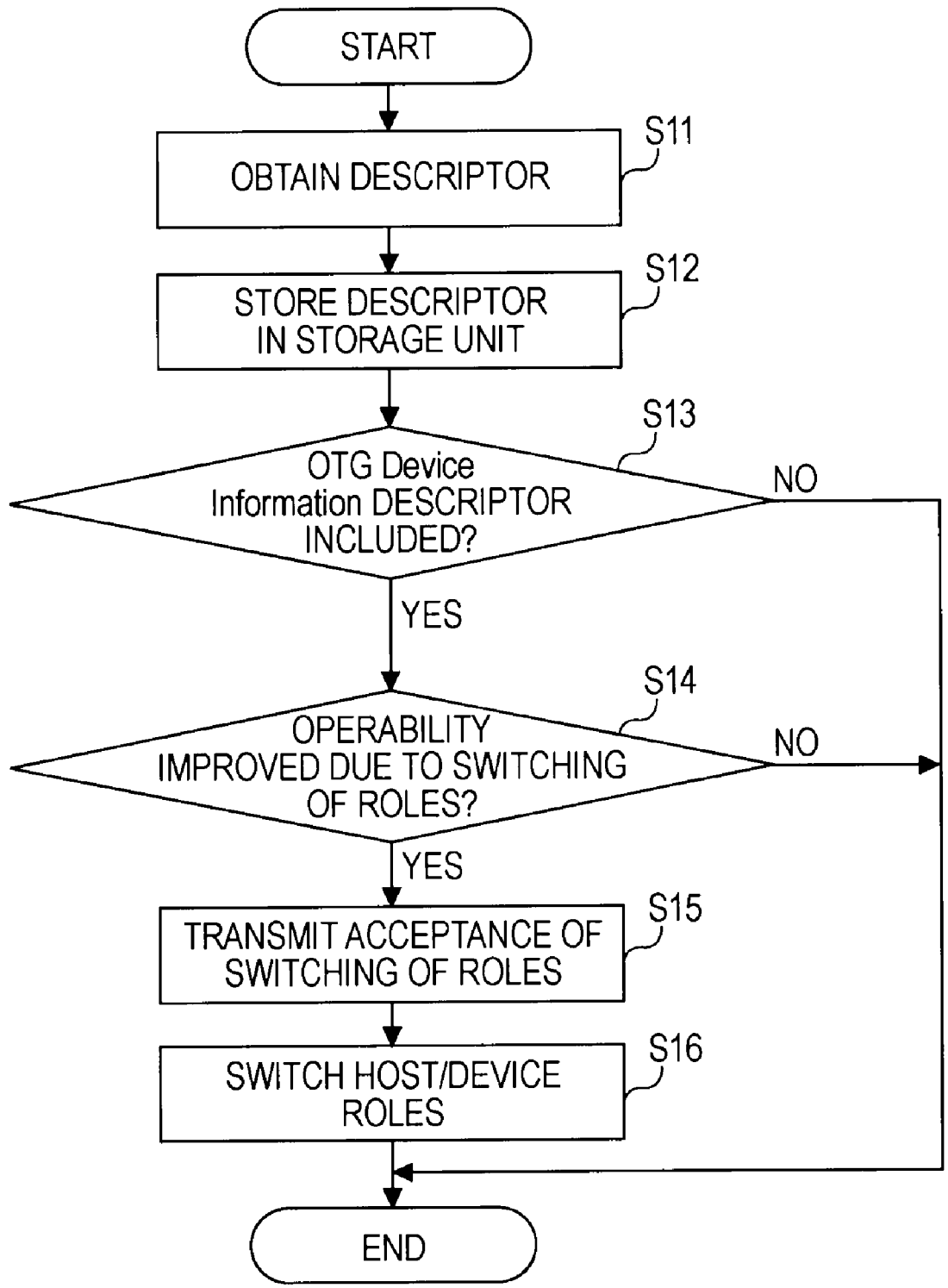
FIG. 4 is a flowchart showing an operating procedure performed by the first communication apparatus acting as the A-device.

FIG. 4 is a flowchart of an operating procedure performed by the communication apparatus 101 acting as the A-device. The operating procedure shown in FIG. 4 is implemented by the control unit 21 executing predetermined program code. It is noted that an operating procedure similar to that described above is performed when the connection direction of the communication cable 50 is reversed so that the communication apparatus 102 acts as the A-device.

At the time of power-on, the communication processing unit 11 of the communication apparatus 101 detects the type of a plug attached to the receptacle terminal 41, and notifies the control unit 21 of the detection result. In the example shown in FIG. 1, since the Mini-A plug terminal 51 is attached to the receptacle terminal 41, the control unit 21 instructs the OTG unit 111 to supply a clock to the host unit 112, and starts the control of the communication apparatus 101 acting as the A-device. In the communication apparatus 102, which is a communication partner of the communication apparatus 101, the Mini-B plug terminal 52 attached to the receptacle terminal 42 is detected, and the control unit 22 starts the control to act as the B-device.

First, the control unit 21 obtains, in the course of enumeration processing, a descriptor from the communication apparatus 102 acting as the device (step S11). The enumeration processing is a communication procedure defined in USB, which is executed when a host and a device start communication. In the enumeration processing, the host collects various types of information concerning the device, and establishes a connection with the device.

Then, the control unit 21 stores in the storage unit 31 various descriptors obtained by the communication processing unit 11 from the communication apparatus 102 in the enumeration processing (step S12).

The control unit 21 determines whether or not the descriptors obtained from the communication partner include a predetermined descriptor including various types of information concerning the device (step S13).

The predetermined descriptor including various types of information concerning the device is hereinafter referred to as an "'OTG Device Information' descriptor". The 'OTG Device Information' descriptor stores software and hardware information concerning a communication apparatus, information relating to input and output devices provided in the communication apparatus, etc.

FIG. 5 shows an example of the data structure of the 'OTG Device Information' descriptor. The 'OTG Device Information' descriptor shown in FIG. 5 includes the following data fields: from the beginning, 'descriptor length', 'descriptor type', 'descriptor index', 'hardware version information', 'firmware version information', 'type of input device (operation unit)', 'type of resolution of output device (display unit)', 'size (inch) of output device (display unit)', and 'amount of information (bit) per pixel of output device (display unit)'.

The 'descriptor length' field contains a total number of bytes of the descriptor. The 'descriptor type' field contains an identifier for identifying the descriptor. The 'descriptor index' field contains an index if a plurality of descriptors exist.

The 'hardware version information' field contains version information of hardware of the communication apparatus. In products of the same type, the hardware may be updated during its life cycle although the functionality may not be largely changed. This field is used to determine whether or not such update has been made. In general, the larger the number, the more the product has been improved.

The 'firmware version information' field contains version information of firmware for controlling the communication apparatus. In most apparatuses, the firmware is rewritable for debugging or additional functionality. This field is used to determine the actually written firmware. In general, the larger the number, the newer or more improved the firmware.

The 'type of input device (operation unit)' field contains a value for specifying the type of an input device serving as an operation unit of the communication apparatus. FIG. 6 shows an example of the correspondence between values and types of input devices.

The 'type of resolution of output device (display unit)' field contains a value for specifying a resolution of an output device serving as a display unit of the communication apparatus. FIG. 7 shows an example of the correspondence between values and screen resolutions of output devices.

The 'size (inch) of output device (display unit)' field contains a size (expressed in inch) of the output device serving as a display unit of the communication apparatus.

The 'amount of information (bit) per pixel of output device (display unit)' field contains an amount of information (expressed in bit) per pixel in the output device serving as a display unit of the communication apparatus. For example, value 8 is stored for a monochrome liquid crystal monitor with luminance information of 8 bits, and value 24 is stored for a color liquid crystal monitor using 8 bits for each of red, green, and blue.

When such an 'OTG Device Information' descriptor is obtained from the communication partner (that is, the communication apparatus 102), the control unit 21 refers to the obtained 'OTG Device Information' descriptor of the communication partner and the 'OTG Device Information' descriptor of the communication apparatus 101, which is stored in the storage unit 31, to compare the operability for the user between a case where the host/device roles have been switched and a case otherwise (step S14).

The 'hardware version information' and 'firmware version information' fields are checked to determine the operability, functionality, and communication stability. If the connected communication apparatuses are of the same type, a communication apparatus with a new version may be higher in operability, functionality, and communication stability, etc., than a communication apparatus with an old version. It is more advantageous for the user to operate the apparatus with newer version information (a larger value), and it is therefore desirable that the apparatus with newer version information (a larger value) be designated as a host. If the connected communication apparatuses are not of the same type, it is not effective to compare version information, and the 'hardware version information' and 'firmware version information' fields are ignored.

The determination as to whether the connected communication apparatuses are of the same type is performed by referring to the fields of device descriptors among the descriptors stored in the storage unit 31 in step S12, such as 'bDeviceClass', 'bDeviceSubClass', 'idvender', 'idproduct' fields, and determining whether or not those fields for the communication apparatuses coincide with each other. The determination may also be performed by using character strings indicating the name of manufacturer and the name of product in a string descriptor, which are specified by 'iManufacturer' and 'iProduct' fields of the device descriptor, respectively.

If the connected communication apparatuses are of different types, the determination in step S14 is performed using the 'type of input device (operation unit)', 'type of resolution of output device (display unit)', 'size (inch) of output device (display unit)', 'amount of information (bit) per pixel of output device (display unit)' fields.

As the values increases for the screen resolution determined from the 'type of resolution of output device (display unit)' field, the size specified in the 'size (inch) of output device (display unit)' field, and the amount of information specified in the 'amount of information (bit) per pixel of output device (display unit)' field, the representation performance of the output device also increases. It is more advantageous for the user to operate the apparatus having larger values, and it is therefore desirable that the apparatus having larger values be designated as a host. For the type specified in the 'type of input device (operation unit)' field, it is desirable that the apparatus including an input device that is regarded as higher-operability device be designated as a host.

In the 'OTG Device Information' descriptor shown in FIG. 5, the fields relating to input and output devices are based on one input device and one output device. If a plurality of input devices or output devices are provided, parameters of the input device or output device having the highest operability or the highest performance are stored. Alternatively, the size of the 'OTG Device Information' descriptor may be changed to store fields for a plurality of input devices and output devices. This allows comprehensive determination on the improvement in operability from the performance states of the plurality of input and output devices in step S14.

Accordingly, the fields of the 'OTG Device Information' descriptors of the communication apparatuses 101 and 102 are compared to determine whether or not to switch the operating modes.

The determination processing of step S14 will now be described with reference to a specific example of the 'OTG Device Information' descriptors shown in FIGS. 8 to 9.

FIG. 8 shows a specific example of the 'OTG Device Information' descriptors of the A-device and B-device in a case where two USB-connected communication apparatuses are of different types.

Since apparatuses of different types are connected, the 'hardware version information' and 'firmware version information' fields are ignored in the determination processing.

The A-device has the 'type of input device (operation unit)' field set to 0x00, which indicates several dedicated hardware keys, and the B-device set to 0x01, which indicates a touch panel. The B-device equipped with a touch panel normally has a higher operability than the A-device equipped with only dedicated hardware keys.

The A-device has the 'type of resolution of output device (display unit)' field set to 0x03, which indicates a resolution of 320×240, and the B-device set to 0x07, which indicates a resolution of 640×480. The B-device with a higher resolution has a higher operability.

The 'size (inch) of output device (display unit)' and 'amount of information (bit) per pixel of output device (display unit)' fields are set to the same value for both the A-device and the B-device.

As a result of the comparison of the respective fields, the B-device has a higher operability, and therefore it is determined that the switching of the host/device roles would improve operability for a user.

FIG. 9 shows a specific example of the 'OTG Device Information' descriptors of the A-device and B-device in a case where two USB-connected communication apparatuses are of the same type.

The 'hardware version information' field is set to the same value for both the A-device and the B-device. As can be seen from the 'firmware version information' field, since the A-device has a newer firmware version, the A-device can be higher in operability and stability. The remaining fields are set to the same values for both the A-device and the B-device.

As a result of the comparison of the respective fields, the A-device has a higher operability, and therefore it is determined that the switching of the operating modes would not improve operability.

While FIGS. 8 and 9 show simple examples, a more complex situation may occur in actual use. For example, the A-device may be determined to be more suitable as a host on the basis of a certain field; whereas the B-device may be determined to be more suitable as a host on the basis of another field. To address such a complex situation, priorities may be allocated in advance to the individual fields to be used for the determination processing, or determination results for the respective fields may be scored and the scores may be weighted and summed before the determination processing is performed.

As a result of comparison in operability between the A-device and the B-device, if it is determined that the switching of the host/device roles would improve user operability (Yes in step S14), the control unit 21 controls the communication processing unit 11 to switch the host/device roles between the communication apparatuses 101 and 102 by using HNP. More specifically, an acceptance of switching the host/device roles is transmitted to the device (step S15) before the host/device roles are actually switched (step S16). Thus, the host/device role switching process ends, and the communication apparatuses 101 and 102 now act as the device and the host, respectively, to perform their communication operations.

As a result of comparison in operability between the A-device and the B-device, if it is determined that the switching of the host/device roles would not improve user operability (No in step S14), the processing routine ends, and the communication apparatuses 101 and 102 still act as the host and the device, respectively, to perform their communication operations.

Next, an example of a communication procedure performed by the communication apparatus 101 acting as the A-device with respect to the communication apparatus 102 acting as the B-device according to the operating procedure shown in FIG. 4 will be described.

Upon detection of the B-device being USB-connected, the A-device executes the enumeration processing described above. In the enumeration processing, the A-device transmits a standard USB request 'Get Descriptor (Configuration)' to the B-device.

'Get Descriptor' is a request for requesting the transmission of a descriptor including apparatus information concerning a device from the device to the host. The 'Get Descriptor (Configuration)' is a request for specifying a descriptor including information relating to apparatus performance or functionality, called 'configuration descriptor', as a descriptor that is requested to the device.

According to OTG, upon a request for a 'configuration descriptor' coming from a host device using the 'Get Descriptor (Configuration)', a DRD transmits a descriptor called 'OTG descriptor', in addition to the 'configuration descriptor', to the host device. The 'OTG descriptor' is a descriptor including information indicating whether or not the DRD supports SRP and HNP.

In a standard transaction, upon receipt of a 'Get Descriptor (Configuration)' request from a host device, a DRD transmits the 'OTG descriptor' to the A-device in addition to the 'configuration descriptor' and its relevant descriptor.

In the first embodiment, the communication apparatus 101 or 102 transmits the 'OTG Device Information' descriptor described above to the A-device in addition to the 'OTG descriptor'.

The 'OTG Device Information' descriptor is a method complying with the USB 2.0 and OTG standards, and is transmitted from the B-device to the A-device.

The A-device compares the obtained 'OTG Device Information' descriptor with the 'OTG Device Information' descriptor of the A-device. If it is determined on the basis of the comparison result that the switching of the host/device roles would improve operability, the A-device transmits an additional standard request 'Set Feature (b_hnp_enable)' to the B-device by using OTG. Upon receipt of the request, the B-device recognizes that the switching of the host/device roles has been accepted, and returns an affirmative response to the A-device.

Upon receipt of the affirmative response from the B-device, the A-device sets the communication state into a suspend state, and stops the communication with the B-device. When the B-device recognizes suspension of the communication, the A-device and the B-device exchange their host/device roles by using HNP, and the A-device changes its role to a device while the B-device changes its role to a host.

Although not specifically shown in FIG. 4, if the 'OTG descriptor' obtained from the B-device includes HNP-incompatible information, the A-device does not perform HNP-based control, and the devices perform the communication operations without changing their initial host/device roles.

In the first embodiment, therefore, the communication apparatus 101 or 102, when initially acting as a host, obtains a descriptor from the communication partner acting as a device under control of the control unit 21 or 22, the descriptor containing software and hardware information concerning a communication apparatus, information relating to input and output devices provided in the communication apparatus, etc. The control unit 21 or 22 refers to the obtained descriptor of the communication partner and the descriptor stored therein to determine whether or not the switching of the host/device roles would improve operability. If it is determined that the switching of the host/device roles would improve operability, the communication partner is notified of an acceptance of switching the host/device roles by using HNP according to an instruction given by the control unit 21 or 22, and the host/device roles are switched by using HNP.

With the operation described above, even if the high operability of the B-device is not fully utilized in an initial state where the communication cable 50 is connected, the host/device roles are automatically switched to allow the user to enjoy USB communication with high operability.

Since the operating procedure for obtaining information concerning the communication partner and switching the host/device roles is performed using a method complying with the USB 2.0 and OTG standards, the first embodiment can be readily applied to devices compatible with those standards.

Further, the processing for switching the host/device roles, described above, is executed primarily by the control units 21 and 22. This means that the processing can be implemented by a computer. Thus, an existing communication apparatus whose overall operations involving communication processing are controlled by a computer can also implement the functions of the first embodiment by modifying a program without specially changing the hardware configuration thereof.

Second Embodiment

In the first embodiment, the host/device roles initially assigned to the A-device and the B-device are switched by taking operability of devices into account. In a second embodiment of the present invention, on the other hand, the host/device roles are switched on the basis of user convenience based on the individual use conditions of the devices or the statuses of the devices.

It is convenient due to reduced time spent on user's movement or the like that, for example, the host function be assigned to a device plugged later. It is also convenient due to reduced time spent on user's movement or the like that the host function be assigned to a device whose user interface has been operated by a user or a device that has been moved around the user. It is also convenient due to reduced time spent on user's movement or the like that the host function be assigned to a device that has an application operating thereon for performing USB communication or that is being prepared for USB communication.

Figure 10:
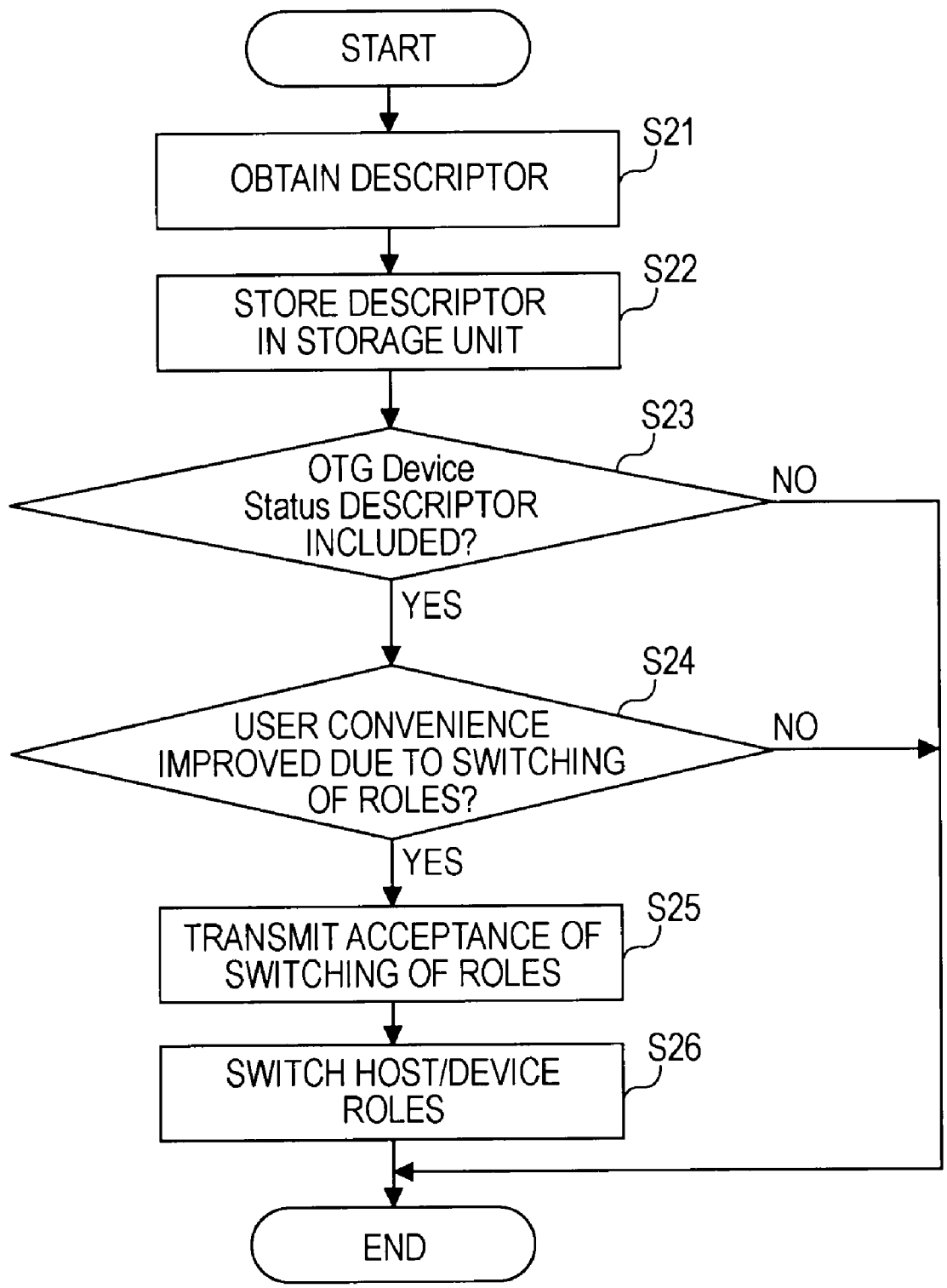
FIG. 10 is a flowchart showing an operating procedure performed by the first communication apparatus acting as the A-device.

FIG. 10 is a flowchart showing an operating procedure performed by the communication apparatus 101 acting as the A-device. The operating procedure shown in FIG. 10 is implemented by the control unit 21 executing predetermined program code. It is noted that an operating procedure similar to that described above is performed when the connection direction of the communication cable 50 is reversed so that the communication apparatus 102 acts as the A-device.

At the time of power-on, the communication processing unit 11 of the communication apparatus 101 detects the type of a plug attached to the receptacle terminal 41, and notifies the control unit 21 of the detection result. In the example shown in FIG. 1, since the Mini-A plug terminal 51 is attached to the receptacle terminal 41, the control unit 21 instructs the OTG unit 111 to supply a clock to the host unit 112, and starts the control of the communication apparatus 101 acting as the A-device. In the communication apparatus 102, which is a communication partner of the communication apparatus 101, the Mini-B plug terminal 52 attached to the receptacle terminal 42 is detected, and the control unit 22 starts the control to act as the B-device.

First, the control unit 21 obtains, in the course of enumeration processing, a descriptor from the communication apparatus 102 acting as the device (step S21). The enumeration processing is a communication procedure defined in USB, which is executed when a host and a device start communication. In the enumeration processing, the host collects various types of information concerning the device, and establishes a connection with the device.

Then, the control unit 21 stores in the storage unit 31 various descriptors obtained by the communication processing unit 11 from the communication apparatus 102 in the enumeration processing (step S22).

The control unit 21 determines whether or not the descriptors obtained from the communication partner include a predetermined descriptor including various types of information concerning the device (step S23).

The predetermined descriptor including various types of information concerning the device is hereinafter referred to as an "'OTG Device Status' descriptor". The 'OTG Device Status' descriptor stores information relating to the status of a communication apparatus at the time when the enumeration processing is performed, etc. Thus, the 'OTG Device Status' descriptor is not fixed information concerning the communication apparatus but is variable depending on the situation.

FIG. 11 shows an example of the data structure of the 'OTG Device Status' descriptor. The 'OTG Device Status' descriptor shown in FIG. 11 includes the following data fields: from the beginning, 'descriptor length', 'descriptor type', 'descriptor index', 'ready for communication', 'elapsed time (sec) since cable plugged in', and 'elapsed time (sec) since last user operation'.

The 'descriptor length' field contains a total number of bytes of the descriptor. The 'descriptor type' field contains an identifier for identifying the descriptor. The 'descriptor index' field contains an index if a plurality of descriptors exist.

The 'ready for communication' field is set to 1 if the communication apparatus is available for communication at that time, or is set to 0 otherwise. For example, if a USB cable is plugged in and enumeration processing starts when an application for file transfer is operating on the communication apparatus, the communication apparatus is enabled to perform immediate communication, and this field is set to 1. If no application for USB transfer is in operation, on the other hand, the communication apparatus may not be available for communication, and this field is set to 0.

The 'elapsed time (sec) since cable plugged in' field contains an elapsed time (expressed in second) since a USB cable was plugged into the communication apparatus until the enumeration processing is performed to transfer an 'OTG Device Status' descriptor.

The 'elapsed time (sec) from last user operation' field contains an elapsed time (expressed in second) since the last time the user operated the communication apparatus until the enumeration processing is performed to transfer an 'OTG Device Status' descriptor.

When such an 'OTG Device Status' descriptor is obtained from the communication partner (that is, the communication apparatus 102), the control unit 21 refers to the obtained 'OTG Device Status' descriptor of the communication partner and the respective fields of an 'OTG Device Status' descriptor in information concerning the communication apparatus 101, which is detected by the control unit 21, to compare the operability for the user between a case where the host/device roles have been switched and a case otherwise (step S24).

For example, in a case where a copy of data or the like is transferred between two communication apparatuses, in a situation where either of the apparatuses is available for a communication operation, a user might possibly desire to operate one of the apparatuses that has an application operating thereon for copying data. That is, higher user convenience may be obtained by operating the apparatus having the 'ready for communication' field set to 1. Thus, the apparatus having the 'ready for communication' field set to 1 is designated as a host.

It is difficult for a user to plug the communication cable 50 into two communication apparatuses at the same time. The user generally connects the communication cable 50 to one of the communication apparatuses in sequence. The later connected communication apparatus may possibly be held with the user's hand or may possibly be near the user. The operation on the later connected communication apparatus would provide higher convenience due to reduced time spent on changing of the apparatuses, user's movement, or the like. That is, as a result of comparison of the 'elapsed time (sec) since cable plugged in' field between the connected communication apparatuses, higher user convenience may be obtained by operating the apparatus with less elapsed time. Thus, the apparatus having the 'elapsed time (sec) since cable plugged in' field set to a smaller value is designated as a host.

Likewise, the communication apparatus that was operated by the user later may possibly be held with the user's hand or may possibly be near the user. That is, as a result of comparison of the 'elapsed time (sec) since last user operation' field between the connected communication apparatuses, higher user convenience may be obtained by operating the apparatus with less elapsed time. Thus, the apparatus with the 'elapsed time (sec) since last user operation' field set to a smaller value is designated as a host.

Accordingly, the fields of the 'OTG Device Status' descriptors of the communication apparatuses 101 and 102 and information associated therewith are compared to determine whether or not to switch the host/device roles.

The determination processing of step S24 will now be described with reference to a specific example of an 'OTG Device Status' descriptor.

FIG. 12 shows a specific example of an 'OTG Device Status' descriptor of the B-device (that is, the communication apparatus 102).

The A-device (that is, the communication apparatus 101), on the other hand, has the 'ready for communication', 'elapsed time (sec) since cable plugged in', and 'elapsed time (sec) since last user operation' fields set to 0×0, 0×80, and 0×FF, respectively, by way of example.

For either of the communication apparatuses, a time of 255 seconds or more has elapsed since the last user operation. However, since the B-device has been prepared for communication, the user may possibly desire to operate the B-device. Further, since the B-device takes less elapsed time since the communication cable 50 was plugged in, the B-device may possibly be near the user and it is therefore more convenient that the B-device be operated. As can be seen from the two viewpoints described above, therefore, higher user convenience may be obtained by operating the B-device, and it may be determined that the host/device roles are to be switched.

While simple examples have been described, a more complex situation may occur in actual use. For example, it may be determined higher user convenience will be obtained by assigning a host to the A-device on the basis of a certain field; whereas it may be determined that higher user convenience will be obtained by assigning a host to the B-device on the basis of another field. To address such a complex situation, priorities may be allocated in advance to the individual fields to be used for the determination processing, or determination results for the respective fields may be scored and the scores may be weighted and summed before the determination processing is performed.

As a result of comparison in user convenience between the A-device and the B-device, if it is determined that the switching of the host/device roles would improve user convenience (Yes in step S24), the control unit 21 controls the communication processing unit 11 to switch the operating modes between the communication apparatuses 101 and 102 by using HNP. More specifically, an acceptance of switching the host/device roles is transmitted to the device (step S25) before the host/device roles are actually switched (step S26). Thus, the host/device role switching process ends, and the communication apparatuses 101 and 102 now act as the device and the host, respectively, and perform their communication operations.

As a result of comparison in user convenience between the A-device and the B-device, if it is determined that the switching of the host/device roles would not improve user convenience (No in step S24), the processing routine ends, and the communication apparatuses 101 and 102 still act as the host and the device, respectively, and perform their communication operations.

A communication procedure performed by the communication apparatus 101 acting as the A-device with respect to the communication apparatus 102 acting as the B-device according to the operating procedure shown in FIG. 10 is similar to that of the first embodiment, except for the descriptor used therefor and its accompanying method of determining whether or not to switch the host/device roles, and will not be discussed herein.

In the second embodiment, therefore, the communication apparatus 101 or 102, when initially acting as a host, obtains a descriptor from the communication partner acting as a device under control of the control unit 21 or 22, the descriptor containing information relating to the individual use conditions of the apparatuses or the statuses of the apparatuses, etc. The control unit 21 or 22 refers to the obtained descriptor of the communication partner and the descriptor detected therein to determine whether or not the switching of the host/device roles would improve user convenience. If it is determined that the switching of the host/device roles would improve user convenience, the communication partner is notified of an acceptance of switching the host/device roles by using HNP according to an instruction given by the control unit 21 or 22, and the host/device roles are switched by using HNP.

With the operation described above, even if a communication apparatus that is not desired by a user is set to be operated in an initial state where the communication cable 50 is connected, the host/device roles are automatically switched to allow the user to reduce the time spent on changing of the apparatuses or movement.

Since the operating procedure for obtaining information concerning the communication partner and switching the host/device roles is performed using a method complying with the USB 2.0 and OTG standards, the second embodiment can be readily applied to devices compatible with those standards.

Further, the processing for switching the host/device roles, described above, is executed primarily by the control units 21 and 22. This means that the processing can be implemented by a computer. Thus, an existing communication apparatus whose overall operations involving communication processing are controlled by a computer can also implement the functions of the second embodiment by modifying a program without specially changing the hardware configuration thereof.

While specific embodiments of the present invention have been described in detail, it is to be understood that a person skilled in the art could make modifications or alterations to the embodiments without departing from the scope of the present invention.

While several preferred embodiments of the present invention have been discussed herein, embodiments of the present invention are not limited to those embodiments, and other variations may be made thereto.

For example, other embodiments may be conceived for the structure of a communication apparatus, an operation of switching the host/device roles by using HNP, the content of the descriptors, etc. Further, the illustrated flowcharts and communication procedures are merely illustrative and may be suitably modified or changed for implementation.

In either of the foregoing embodiments, it is determined whether or not to switch the operating modes on the basis of information of a descriptor obtained during the enumeration processing. Alternatively, this information may be obtained via communication based on a device request or the like after the enumeration processing.

In USB, the host takes the initiative to utilize various functions or initiate data transmission. It can therefore be necessary to determine whether or not to switch the host/device roles by taking user's preferences into account. In an embodiment of the present invention, therefore, an acknowledgement may be received from a user via a predetermined user interface device before the host/device roles are switched.

For example, when the conditions for switching the host/device roles, described above, are established, a control unit may request a user to confirm whether or not to switch the operating modes through a user interface device. When a response of acceptance of the confirmation request is entered through the user interface device, the host/device roles may be switched.

Furthermore, at least some of the components of the communication apparatuses described in the specification and illustrated in the drawings may be implemented by cooperation of a computer and a software program or by a combination of software and hardware, or all the components may be implemented by hardware.

While the foregoing embodiments have been described herein in the context of a communication system complying with the OTG standard, which is a supplement to the USB 2.0 standard, embodiments of the present invention are not limited to those embodiments. Some embodiments of the present invention may provide various communication interfaces or communication protocols that allow one of devices that has a host role over a communication interface to control the data transmission operation of other devices acting as devices and that allow at least some of devices to have both host and device roles.

While the foregoing embodiments have been described herein in the context of a connection between communication apparatuses capable of fulfilling both host and device roles via a USB cable, embodiments of the present invention are not limited to a specific communication medium. For example, an embodiment of the present invention may provide a communication interface composed of a wireless interface such as a WUSB interface.

Therefore, the foregoing embodiments of the present invention are disclosed herein for illustrative purposes only, and are not intended to limit the scope of the disclosure. Those skilled in the art will appreciate the scope and spirit of the present invention with reference to the appended claims.

It should be understood by those skilled in the art that various modifications, combinations, sub-combinations and alterations may occur depending on design requirements and other factors insofar as they are within the scope of the appended claims or the equivalents thereof.

What is claimed is:

1. A communication system comprising:
    a plurality of communication apparatuses configured to perform data transmission over a predetermined communication interface that allows one of the communication apparatuses to act as a host and to control data transmission and that allows the other communication apparatuses to act as devices and to perform data transmission under control of the host,
    the plurality of communication apparatuses including a first communication apparatus and a second communication apparatus, the first communication apparatus and the second communication apparatus being connected to the predetermined communication interface, each of the first communication apparatus and the and second communication apparatus having both host and device roles, the first communication apparatus and the second communication apparatus being configured to exchange the host and device roles by using a predetermined communication protocol, the first communication apparatus being designated as the host and the second communication apparatus being designated as one of the devices;

apparatus-information transmitting means for transmitting apparatus information relating to a structure or specific information of the second communication apparatus to the first communication apparatus;

determining means for determining whether or not to switch the host and device roles between the first communication apparatus and the second communication apparatus according to a predetermined criterion when the first communication apparatus compares the apparatus information transmitted by the second communication apparatus with apparatus information relating to a structure or specific information of the first communication apparatus; and switching procedure executing means for executing a procedure for switching the host and device roles between the first communication apparatus and the second communication apparatus by using the predetermined communication protocol when an affirmative determination result is obtained from the determining means.

2. A communication apparatus for performing a communication operation over a predetermined communication interface that allows one of a plurality of communication apparatuses to act as a host and to control data transmission and that allows the other communication apparatuses to act as devices and to perform data transmission under control of the host, the communication apparatus having both host and device roles, the predetermined communication interface being specified by a predetermined communication protocol for switching the host and device roles between the communication apparatuses, the communication apparatus comprising:

switching procedure executing means for executing a procedure for switching the host and device roles by using the predetermined communication protocol;

apparatus-information transmitting means for transmitting, when the communication apparatus is designated as the device, apparatus information relating to a structure or specific information of the communication apparatus to a communication apparatus acting as the host over the predetermined communication interface;

apparatus-information receiving means for receiving, when the communication apparatus is designated as the host, the apparatus information from a second communication apparatus acting as the device over the predetermined communication interface; and determining means for comparing, when the communication apparatus is designated as the host, the apparatus information transmitted by the second communication apparatus with the apparatus information relating to a structure or specific information of the communication apparatus to determine whether or not to switch the host and device roles between the communication apparatus and the second communication apparatus according to a predetermined criterion, wherein the switching procedure executing means executes the procedure for switching the host and device roles between the communication apparatus and the second communication apparatus when an affirmative determination result is obtained from the determining means.

3. The communication apparatus according to claim 2, wherein the predetermined communication interface includes a Universal Serial Bus interface, and the predetermined protocol includes Host Negotiation Protocol defined in Universal Serial Bus On-The-Go.

4. The communication apparatus according to claim 2, wherein the apparatus information transmitted by the apparatus information transmitting means includes hardware version information or software version information of the communication apparatus.

5. The communication apparatus according to claim 2, wherein the apparatus information transmitted by the apparatus information transmitting means includes information relating to an output device or input device included in the communication apparatus.

6. The communication apparatus according to claim 2, wherein the predetermined criterion is based on an improvement in user operability or an improvement in user convenience, and the determining means determines whether or not to switch the host and device roles with respect to the second communication apparatus according to the predetermined criterion.

7. A method for controlling a communication apparatus for performing a communication operation over a predetermined communication interface that allows one of a plurality of communication apparatuses to act as a host and to control data transmission and that allows the other communication apparatuses to act as devices and to perform data transmission under control of the host, the communication apparatus having both host and device roles, the predetermined communication interface being specified by a predetermined communication protocol for switching the host and device roles between the communication apparatuses, the method comprising the steps of:

transmitting, when the communication apparatus is designated as the device, apparatus information relating to a structure or specific information of the communication apparatus to a communication apparatus acting as the host over the predetermined communication interface;

receiving, when the communication apparatus is designated as the host, the apparatus information from a second communication apparatus acting as the device over the predetermined communication interface;

comparing, when the communication apparatus is designated as the host, the apparatus information transmitted by the second communication apparatus with the apparatus information relating to a structure or specific information of the communication apparatus to determine whether or not to switch the host and device roles between the communication apparatus and the second communication apparatus according to a predetermined criterion; and executing, when an affirmative determination result is obtained, a procedure for switching the host and device roles between the communication apparatus and the second communication apparatus by suing the predetermined communication protocol.

8. A computer-readable computer program for performing control of a communication apparatus on a computer, the communication apparatus being configured to perform a communication operation over a predetermined communication interface that allows one of a plurality of communication apparatuses to act as a host and to control data transmission and that allows the other communication apparatuses to act as devices and to perform data transmission under control of the host, the communication apparatus having both host and device roles, the predetermined communication interface being specified by a predetermined communication protocol for switching the host and device roles between the communication apparatuses, the computer program causing the computer to execute the steps of:

transmitting, when the communication apparatus is designated as the device, apparatus information relating to a structure or specific information of the communication apparatus to a communication apparatus acting as the host over the predetermined communication interface;

receiving, when the communication apparatus is designated as the host, the apparatus information from a second communication apparatus acting as the device over the predetermined communication interface;

comparing, when the communication apparatus is designated as the host, the apparatus information transmitted by the second communication apparatus with the apparatus information relating to a structure or specific information of the communication apparatus to determine whether or not to switch the host and device roles between the communication apparatus and the second communication apparatus according to a predetermined criterion; and executing, when an affirmative determination result is obtained, a procedure for switching the host and device roles between the communication apparatus and the second communication apparatus by suing the predetermined communication protocol.

9. A communication system comprising:

a plurality of communication apparatuses configured to perform data transmission over a predetermined communication interface that allows which one of the communication apparatuses to act as a host and to control data transmission and that allows the other communication apparatuses to act as devices and to perform data transmission under control of the host, the plurality of communication apparatuses including a first communication apparatus and a second communication apparatus, the first communication apparatus and the second communication apparatus being connected to the predetermined communication interface, each of the first communication apparatus and the second communication apparatus having both host and device roles, the first communication apparatus and the second communication apparatus being configured to exchange the host and device roles by using a predetermined communication protocol, the first communication apparatus being designated as the host and the second communication apparatus being designated as the device;

apparatus-status-information transmitting means for transmitting apparatus-status information relating to a status of the second communication apparatus to the first communication apparatus;

determining means for determining whether or not to switch the host and device roles between the first communication apparatus and the second communication apparatus according to a predetermined criterion when the first communication apparatus compares the apparatus-status information transmitted by the second communication apparatus with apparatus-status information relating to a status of the first communication apparatus; and switching procedure executing means for executing a procedure for switching the host and device roles between the first communication apparatus and the second communication apparatus by using the predetermined communication protocol when an affirmative determination result is obtained from the determining means.

10. A communication apparatus for performing a communication operation over a predetermined communication interface that allows one of a plurality of communication apparatuses to act as a host and to control data transmission and that allows the other communication apparatuses to act as devices and to perform data transmission under control of the host, the communication apparatus having both host and device roles, the predetermined communication interface being specified by a predetermined communication protocol for switching the host and device roles between the communication apparatuses, the communication apparatus comprising:

switching procedure executing means for executing a procedure for switching the host and device roles by using the predetermined communication protocol;

apparatus-status-information transmitting means for transmitting, when the communication apparatus is designated as the device, apparatus-status information relating to a status of the communication apparatus to a communication apparatus acting as the host over the predetermined communication interface;

apparatus-status information receiving means for receiving, when the communication apparatus is designated as the host, the apparatus-status information from a second communication apparatus acting as the device over the predetermined communication interface; and determining means for comparing, when the communication apparatus is designated as the host, the apparatus-status information transmitted by the second communication apparatus with apparatus-status information relating to a status of the communication apparatus to determine whether or not to switch the host and device roles between the communication apparatus and the second communication apparatus according to a predetermined criterion, wherein the switching procedure executing means executes the procedure for switching the host and device roles between the communication apparatus and the second communication apparatus when an affirmative determination result is obtained from the determining means.

11. The communication apparatus according to claim 10, wherein the predetermined communication interface includes a Universal Serial Bus interface, and the predetermined protocol includes Host Negotiation Protocol defined in Universal Serial Bus On-The-Go.

12. The communication apparatus according to claim 10, wherein the apparatus-status information transmitted by the apparatus-status-information transmitting means includes information indicating whether or not the communication apparatus is ready to perform communication.

13. The communication apparatus according to claim 10, wherein the apparatus-status information transmitted by the apparatus-status-information transmitting means includes a status of an application operating on the communication apparatus.

14. The communication apparatus according to claim 10, wherein the apparatus-status information transmitted by the apparatus-status-information transmitting means includes information relating to a time that has elapsed since the communication apparatus was connected to the predetermined communication interface.

15. The communication apparatus according to claim 10, wherein the apparatus-status information transmitted by the apparatus-status-information transmitting means includes information relating to a time that has elapsed since the last time a user operated the communication apparatus.

16. The communication apparatus according to claim 10, wherein the predetermined criterion is based on an improvement in user operability or an improvement in user convenience, and the determining means determines whether or not to switch the host and device roles between the second communication apparatus according to the predetermined criterion.

17. A method for controlling a communication apparatus for performing a communication operation over a predetermined communication interface that allows one of a plurality of communication apparatuses to act as a host and to control data transmission and that allows the other communication apparatuses to act as devices and to perform data transmission under control of the host, the communication apparatus having both host and device roles, the predetermined communication interface being specified by a predetermined communication protocol for switching the host and device roles between the communication apparatuses, the method comprising the steps of:

transmitting, when the communication apparatus is designated as the device, apparatus-status information relating to a status of the communication apparatus to a communication apparatus acting as the host over the predetermined communication interface;

receiving, when the communication apparatus is designated as the host, the apparatus-status information from a second communication apparatus acting as the device over the predetermined communication interface;

comparing, when the communication apparatus is designated as the host, the apparatus-status information transmitted by the second communication apparatus with apparatus-status information relating to a status of the communication apparatus to determine whether or not to switch the host and device roles between the communication apparatus and the second communication apparatus according to a predetermined criterion; and executing, when an affirmative determination result is obtained, a procedure for switching the host and device roles between the communication apparatus and the second communication apparatus by suing the predetermined communication protocol.

18. A computer-readable computer program for performing control of a communication apparatus on a computer, the communication apparatus being configured to perform a communication operation over a predetermined communication interface that allows one of a plurality of communication apparatuses to act as a host and to control data transmission and that allows the other communication apparatuses to act as devices and to perform data transmission under control of the host, the communication apparatus having both host and device roles, the predetermined communication interface being specified by a predetermined communication protocol for switching the host and device roles between the communication apparatuses, the computer program causing the computer to execute the steps of:

transmitting, when the communication apparatus is designated as the device, apparatus-status information relating to a status of the communication apparatus to a communication apparatus acting as the host over the predetermined communication interface;

receiving, when the communication apparatus is designated as the host, the apparatus-status information from a second communication apparatus acting as the device over the predetermined communication interface;

comparing, when the communication apparatus is designated as the host, the apparatus-status information transmitted by the second communication apparatus with apparatus-status information relating to a status of the communication apparatus to determine whether or not to switch the host and device roles between the communication apparatus and the second communication apparatus according to a predetermined criterion; and executing, when an affirmative determination result is obtained, a procedure for switching the host and device roles between the communication apparatus and the second communication apparatus by suing the predetermined communication protocol.

19. A communication system comprising:

a plurality of communication apparatuses configured to perform data transmission over a predetermined communication interface that allows one of the communication apparatuses to act as a host and to control data transmission and that allows the other communication apparatuses to act as devices and to perform data transmission under control of the host, the plurality of communication apparatuses including a first communication apparatus and a second communication apparatus, the first communication apparatus and the second communication apparatus being connected to the predetermined communication interface, each of the first communication apparatus and the and second communication apparatus having both host and device roles, the first communication apparatus and the second communication apparatus being configured to exchange the host and device roles by using a predetermined communication protocol, the first communication apparatus being designated as the host and the second communication apparatus being designated as one of the devices;

an apparatus-information transmitting unit configured to transmit apparatus information relating to a structure or specific information of the second communication apparatus to the first communication apparatus;

a determining unit configured to determine whether or not to switch the host and device roles between the first communication apparatus and the second communication apparatus according to a predetermined criterion when the first communication apparatus compares the apparatus information transmitted by the second communication apparatus with apparatus information relating to a structure or specific information of the first communication apparatus; and a switching procedure executing unit configured to execute a procedure for switching the host and device roles between the first communication apparatus and the second communication apparatus by using the predetermined communication protocol when an affirmative determination result is obtained from the determining unit.

20. A communication apparatus for performing a communication operation over a predetermined communication interface that allows one of a plurality of communication apparatuses to act as a host and to control data transmission and that allows the other communication apparatuses to act as devices and to perform data transmission under control of the host, the communication apparatus having both host and device roles, the predetermined communication interface being specified by a predetermined communication protocol for switching the host and device roles between the communication apparatuses, the communication apparatus comprising:

a switching procedure executing unit configured to execute a procedure for switching the host and device roles by using the predetermined communication protocol;

an apparatus-information transmitting unit configured to transmit, when the communication apparatus is designated as the device, apparatus information relating to a structure or specific information of the communication apparatus to a communication apparatus acting as the host over the predetermined communication interface;

an apparatus-information receiving unit configured to receive, when the communication apparatus is designated as the host, the apparatus information from a second communication apparatus acting as the device over the predetermined communication interface; and a determining unit configured to compare, when the communication apparatus is designated as the host, the apparatus information transmitted by the second communication apparatus with the apparatus information relating to a structure or specific information of the communication apparatus to determine whether or not to switch the host and device roles between the communication apparatus and the second communication apparatus according to a predetermined criterion, wherein the switching procedure executing unit executes the procedure for switching the host and device roles between the communication apparatus and the second communication apparatus when an affirmative determination result is obtained from the determining unit.

21. A communication system comprising:

a plurality of communication apparatuses configured to perform data transmission over a predetermined communication interface that allows which one of the communication apparatuses to act as a host and to control data transmission and that allows the other communication apparatuses to act as devices and to perform data transmission under control of the host, the plurality of communication apparatuses including a first communication apparatus and a second communication apparatus, the first communication apparatus and the second communication apparatus being connected to the predetermined communication interface, each of the first communication apparatus and the second communication apparatus having both host and device roles, the first communication apparatus and the second communication apparatus being configured to exchange the host and device roles by using a predetermined communication protocol, the first communication apparatus being designated as the host and the second communication apparatus being designated as the device;

an apparatus-status-information transmitting unit configured to transmit apparatus-status information relating to a status of the second communication apparatus to the first communication apparatus;

a determining unit configured to determine whether or not to switch the host and device roles between the first communication apparatus and the second communication apparatus according to a predetermined criterion when the first communication apparatus compares the apparatus-status information transmitted by the second communication apparatus with apparatus-status information relating to a status of the first communication apparatus; and a switching procedure executing unit configured to execute a procedure for switching the host and device roles between the first communication apparatus and the second communication apparatus by using the predetermined communication protocol when an affirmative determination result is obtained from the determining unit.

22. A communication apparatus for performing a communication operation over a predetermined communication interface that allows one of a plurality of communication apparatuses to act as a host and to control data transmission and that allows the other communication apparatuses to act as devices and to perform data transmission under control of the host, the communication apparatus having both host and device roles, the predetermined communication interface being specified by a predetermined communication protocol for switching the host and device roles between the communication apparatuses, the communication apparatus comprising:

a switching procedure executing unit configured to execute a procedure for switching the host and device roles by using the predetermined communication protocol;

an apparatus-status-information transmitting unit configured to transmit, when the communication apparatus is designated as the device, apparatus-status information relating to a status of the communication apparatus to a communication apparatus acting as the host over the predetermined communication interface;

an apparatus-status information receiving unit configured to receive, when the communication apparatus is designated as the host, the apparatus-status information from a second communication apparatus acting as the device over the predetermined communication interface; and a determining unit configured to compare, when the communication apparatus is designated as the host, the apparatus-status information transmitted by the second communication apparatus with apparatus-status information relating to a status of the communication apparatus to determine whether or not to switch the host and device roles between the communication apparatus and the second communication apparatus according to a predetermined criterion, wherein the switching procedure executing unit executes the procedure for switching the host and device roles between the communication apparatus and the second communication apparatus when an affirmative determination result is obtained from the determining unit.

\* \* \* \* \*